D. WELLS.
Chimney Cowl.
No. 9,375.
Patented Nov. 2, 1852.
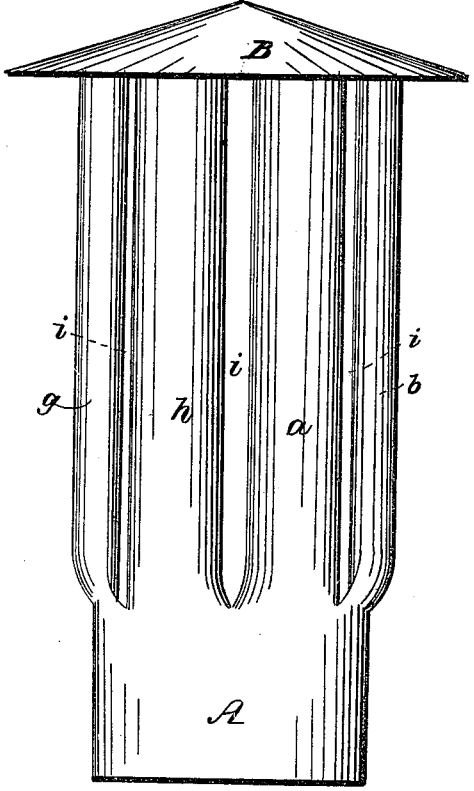
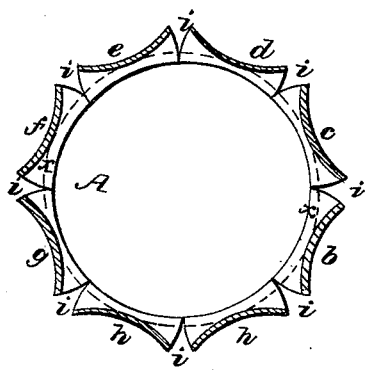
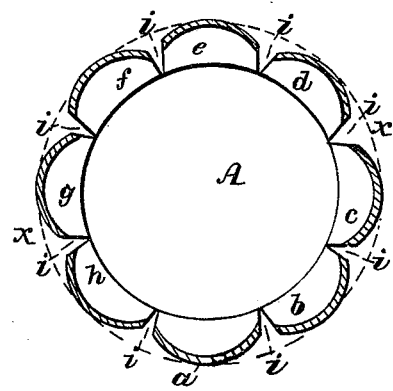

UNITED STATES PATENT OFFICE.

DAVID WELLS, OF LOWELL, MASSACHUSETTS.

VENTILATOR.

Specification of Letters Patent No. 9,375, dated November 2, 1852.

*To all whom it may concern:*

Be it known that I, DAVID WELLS, of Lowell, in the county of Middlesex and State of Massachusetts, have invented a new and useful improvements in ventilators for the discharge of smoke or foul air from chimneys or apartments or the injection of fresh air into apartments; and I do hereby declare that the same is fully described and represented in the following specification and the accompanying drawings, letters, figures, and references thereof.

Of the said drawings Figure 1 denotes a side view of one of my improved ejecting ventilators. Fig. 2 is a horizontal section of it. Fig. 3 is a horizontal section of an injecting ventilator made on my improved plan.

In Figs. 1 and 2 of the said drawings $a$, $b$, $c$, $d$, $e$, $f$, $g$, $h$, denote a series of vertical plates set up at equal distances apart and around a common center and made to project from and above a tube A. Between each two plates there is an opening or space $i$. The plates are covered by a conical or pyrimidal cap or roof B. These plates are each curved or made angular or reëntering transversely, the ejecting ventilator having the concave sides of its plates arranged externally as seen in Fig. 2, while the injecting ventilator has the convex sides of its plates arranged externally or made to face outward, as seen in Fig. 3.

A ventilator so made will not only be found to be simple in its construction but highly efficient in its operation.

I have discovered that when the series of curved plates $a$, $b$, $c$, etc., are arranged with their concave sides facing outward, the curvatures have such an effect on the wind that impinges against them as to create a powerful draft up the flue and out of the openings of the ventilator. I have also discovered that on reversing the positions of the curvatures of the plates or arranging them as shown in Fig. 3, they will cause the wind when blowing against their external sides to pass into the openings $i$, $i$, etc., and down the flue in a very strong current.

The dotted line $x$ in Figs. 2, 3, represents the general alinement or line of arrangement of the set of plates around a common axis.

I do not claim a ventilator made of a series of flat plates arranged in a circle with openings between them; nor do I claim one made of a series of plates arranged in a circle or around an axis and with openings between them and each made to stand tangential or curved (transversely) to the arc of a circle or curved line of the set of plates; but What I do claim as my invention is—

A ventilator constructed of a single series of curved or angular plates $a$, $b$, $c$, etc., and openings $i$, $i$, $i$, etc., and capped, connected with a tube or flue and having each plate curved or made angular convexly or concavely out of the general line of their arrangement around a common axis, as represented in the drawings.

In testimony whereof I have hereto set my signature, this twenty fourth day of September A. D. 1852.

DAVID WELLS.

Witnesses:
 M. H. COCHRAN,
 ALFRED BERRY.